US010606401B2

(12) United States Patent
Barel et al.

(10) Patent No.: US 10,606,401 B2
(45) Date of Patent: Mar. 31, 2020

(54) MECHANICAL KEYBOARD OVERLAY FOR TOUCH SCREEN

(71) Applicant: Microsoft Technology Licensing, LLC, Redmond, WA (US)

(72) Inventors: Eliyahu Barel, Rosh-HaAyin (IL); Amir Zyskind, Tel Aviv (IL); Ilan Geller, Pardesiya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 28 days.

(21) Appl. No.: 16/037,528

(22) Filed: Jul. 17, 2018

(65) Prior Publication Data

US 2020/0026387 A1 Jan. 23, 2020

(51) Int. Cl.
*G06F 3/041* (2006.01)
*G06F 3/044* (2006.01)
*G06F 3/023* (2006.01)

(52) U.S. Cl.
CPC ............ *G06F 3/0416* (2013.01); *G06F 3/023* (2013.01); *G06F 3/044* (2013.01); *G06F 2203/04104* (2013.01)

(58) Field of Classification Search
CPC ...... G05F 3/018; G05F 3/0362; G05F 3/0489; H04M 1/22; H04M 1/23
See application file for complete search history.

(56) References Cited

U.S. PATENT DOCUMENTS

| 6,776,546 | B2 * | 8/2004 | Kraus | B41J 5/102 400/472 |
|---|---|---|---|---|
| 6,880,998 | B2 | 4/2005 | Kraus et al. | |
| 8,988,355 | B2 | 3/2015 | Solomon et al. | |
| 9,317,202 | B2 | 4/2016 | Melmon et al. | |
| 2002/0186525 | A1 * | 12/2002 | Singh | G06F 1/1632 361/679.12 |
| 2010/0207888 | A1 | 8/2010 | Camiel | |
| 2010/0302168 | A1 * | 12/2010 | Giancarlo | G06F 1/1662 345/169 |
| 2011/0241999 | A1 * | 10/2011 | Thier | G06F 3/023 345/168 |

(Continued)

FOREIGN PATENT DOCUMENTS

| EP | 2701033 A1 | 2/2014 |
|---|---|---|
| GB | 2516439 A | 1/2015 |

OTHER PUBLICATIONS

"International Search Report and Written Opinion Issued In PCT Application No. PCT/US2019/037586", dated Oct. 1, 2019, 13 Pages.

*Primary Examiner* — Ryan A Lubit
(74) *Attorney, Agent, or Firm* — Alleman Hall Creasman & Tuttle LLP

(57) ABSTRACT

A mechanical keyboard for use on a touch screen comprises an individually and resiliently depressible key and a network of electrical conductors. They key includes a user-facing outer portion and a screen-facing, electrically conductive inner portion, the inner portion being configured to approach the touch screen during depression of the key. The network of electrical conductors is configured to conduct a drive signal to the inner portion of the key, the drive signal being received, during the depression of the key, at a locus of touch screen directly beneath the key.

20 Claims, 5 Drawing Sheets

(56) References Cited

U.S. PATENT DOCUMENTS

| | | |
|---|---|---|
| 2012/0086642 A1 | 4/2012 | Weihe |
| 2013/0346636 A1 | 12/2013 | Bathiche et al. |
| 2014/0022174 A1 | 1/2014 | Chen |
| 2014/0055363 A1* | 2/2014 | Meierling ............. G06F 1/1662 345/169 |
| 2015/0193010 A1 | 7/2015 | Tsukamoto et al. |
| 2016/0011738 A1* | 1/2016 | Bang ..................... G06F 1/1637 345/173 |
| 2016/0048261 A1 | 2/2016 | Argiro |

* cited by examiner

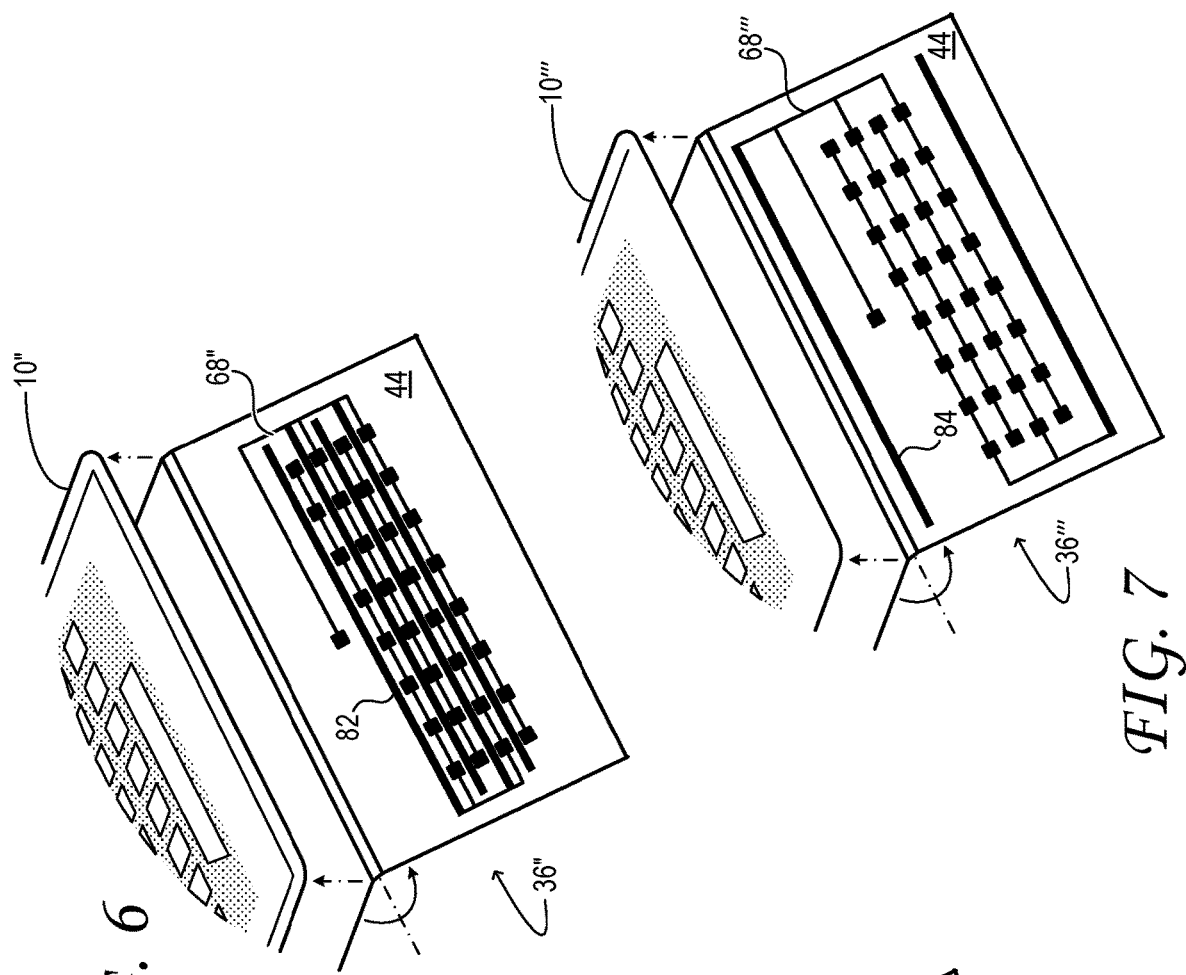
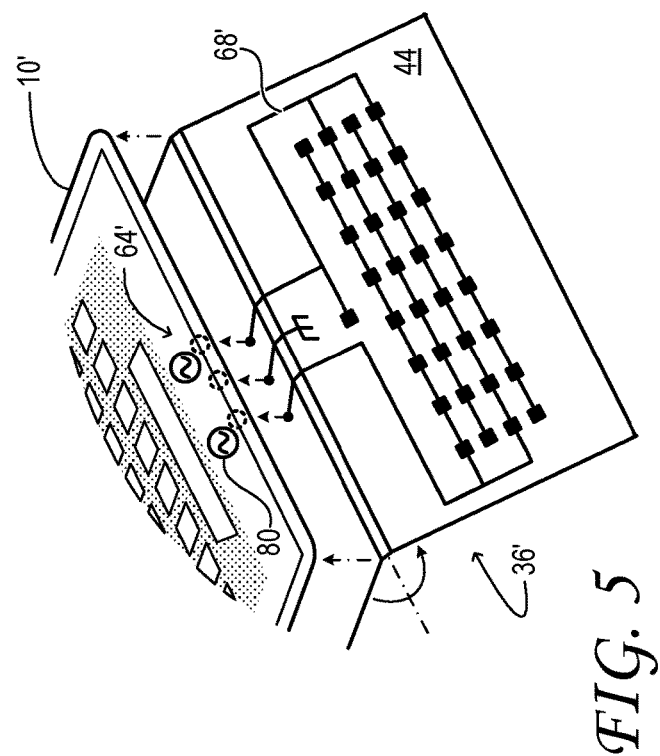

MECHANICAL KEYBOARD OVERLAY FOR TOUCH SCREEN

BACKGROUND

A mechanical alphanumeric keyboard is an efficient accessory for receiving text entry by a user of an electronic device. Not every text-receiving electronic device is natively configured to accept input from a mechanical keyboard, however. A touch-screen device, for example, may present a virtual keyboard. The virtual keyboard may support typing in a manner similar to a mechanical keyboard, but may not offer as satisfying a user experience as a mechanical keyboard. This is due to various differences between the tactile experience of touching a virtual key versus depressing a mechanical key (which offers resistance, exhibits a force threshold, etc.)

SUMMARY

One aspect of this disclosure is directed to a mechanical keyboard for use on a touch screen. The mechanical keyboard comprises an individually and resiliently depressible key and a network of electrical conductors. They key includes a user-facing outer portion and a screen-facing, electrically conductive inner portion, the inner portion being configured to approach the touch screen during depression of the key. The network of electrical conductors is configured to conduct a drive signal to the inner portion of the key, the drive signal being received, during the depression of the key, at a locus of touch screen directly beneath the key.

Another aspect of this disclosure is directed to an electronic device adaptable to receive a mechanical keyboard. The electronic device comprises a touch screen and an electrical interface for connection to the mechanical keyboard, which comprises an individually and resiliently depressible key and a network of electrical conductors. The key includes a user-facing outer portion and a screen-facing, electrically conductive inner portion, the inner portion being configured to approach the touch screen during depression of the key. The network of electrical conductors is configured to conduct a drive signal to the inner portion of the key, the drive signal being received, during the depression of the key, at a locus of touch screen directly beneath the key.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5, 6, and 7 show aspects of additional electronic devices each having a touch screen and a mechanical-keyboard overlay.

DETAILED DESCRIPTION

Figure 1:
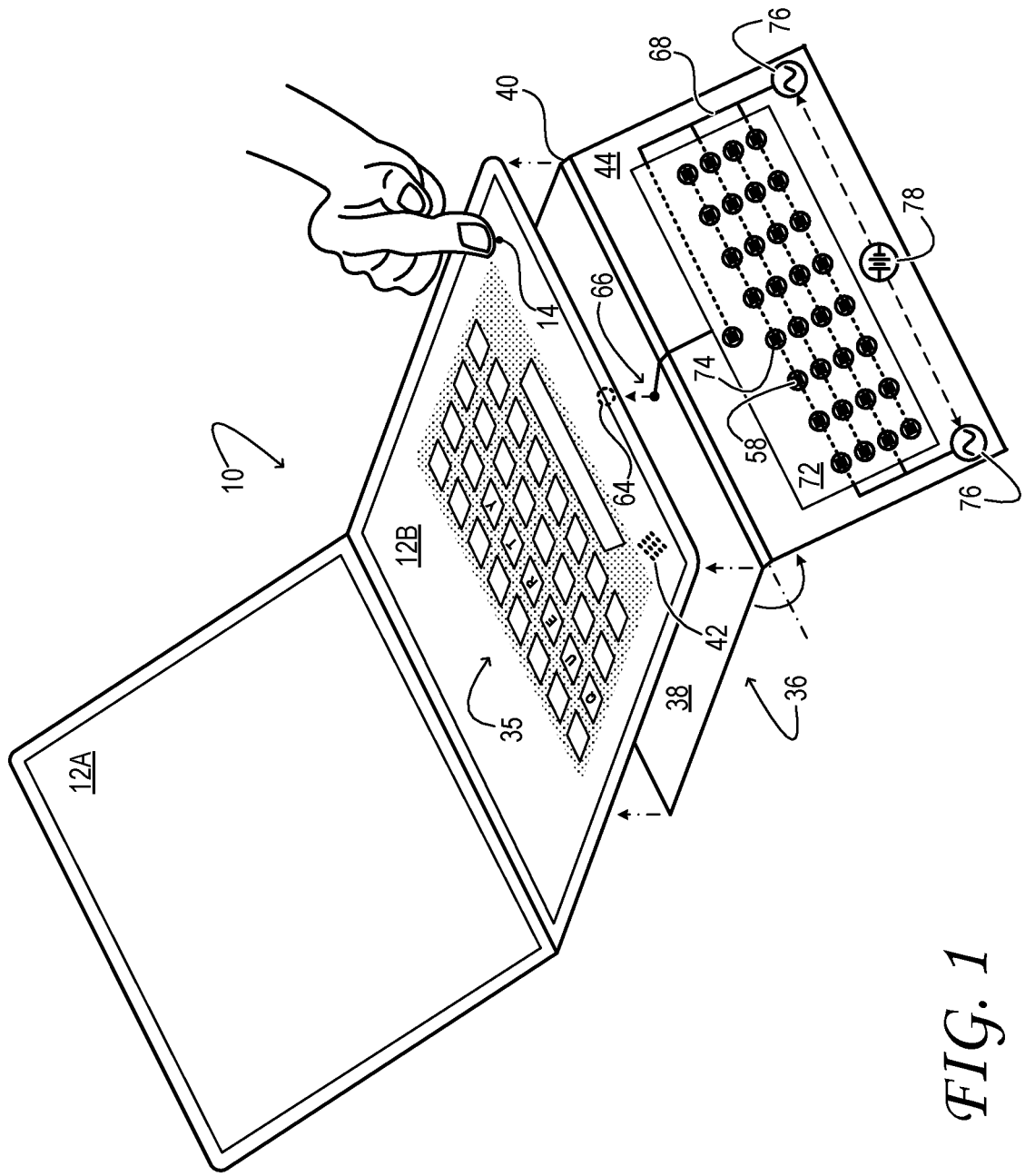
FIG. 1 shows aspects of an example electronic device having a touch screen and a mechanical-keyboard overlay.

This disclosure is presented by way of example and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an example electronic device 10. As illustrated, the electronic device takes the form of a foldable tablet computer. In other examples, the electronic device may take the form of a laptop computer or flip phone. Electronic devices of numerous other types, sizes, and form factors are equally consonant with this disclosure.

Electronic device 10 includes two independent touch screens 12A and 12B. Other example electronic devices may include only one touch screen, or more than two. In electronic devices having plural touch screens, the plural touch screens may be the same or different from each other with respect to dimensions and/or technology.

Touch screen 12B of FIG. 1 is configured to sense one or more touch points effected by a user. One example touch point 14 is the point of contact between the user's fingertip and the touch-sensing surface of the touch screen. The terms 'touch screen' and 'touch point' should not be construed to limit the range of detectable user-effected events to those in which the user makes direct physical contact with electronic device 10. In some implementations, a point at which the user's finger or stylus hovers closely above the touch screen may also be detected, and may be referred to as a touch point.

Figure 2:
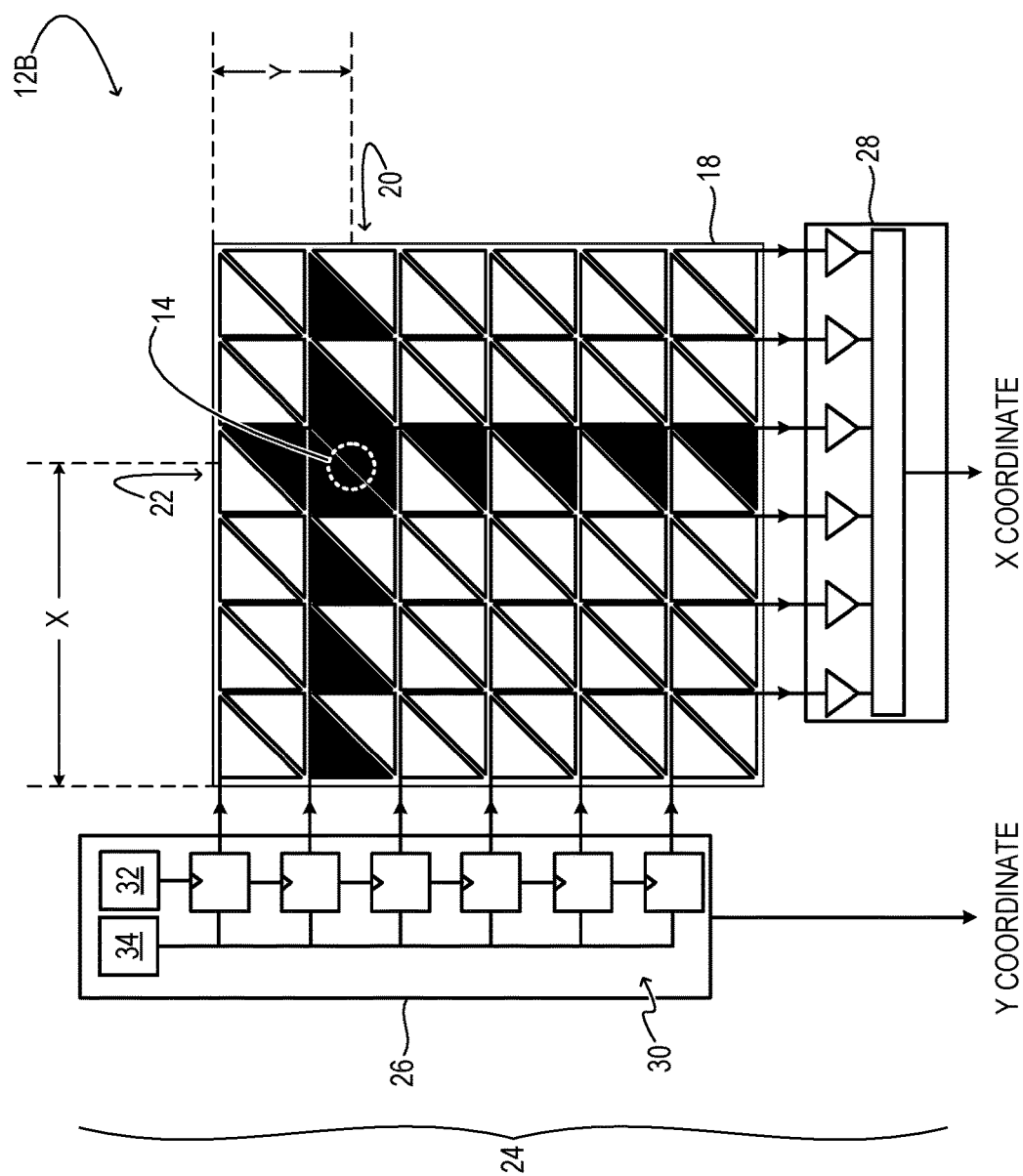
FIG. 2 shows aspects of an example touch screen of an electronic device.

FIG. 2 shows additional aspects of touch screen 12B in one example configuration. Touch screen 12B of FIG. 2 is a so-called 'capacitive' touch screen. Arranged beneath the touch-sensing surface 18 of the touch screen are a series of row electrodes 20 and a series of column electrodes 22. Touch screens envisaged herein may include any number N of row electrodes and any number M of column electrodes. Although it is customary to have the row electrodes aligned horizontally and the column electrodes aligned vertically, that aspect is not necessary: indeed, the terms 'row' and 'column' may be exchanged everywhere in this description.

Continuing in FIG. 2, the row and column electrodes of touch screen 12B are addressed by touch-screen logic 24. The touch-screen logic is configured to sense user interaction on touch-sensing surface 18, including normal coordinates directly behind the point of contact or hover of a finger or stylus on touch-sensing surface 18. To that end, the touch-screen logic includes, inter alia, row-driver logic 26 and column-sense logic 28.

Column-sense logic 28 includes M column amplifiers, each coupled to a corresponding column electrode 22. Row-driver logic 26 includes a row counter 30 in the form of an N-bit shift register, with outputs driving each of the N row electrodes 20. In the example of FIG. 2, the row counter is clocked by row-driver clock 32. The row counter includes a blanking input to transiently force all output values to ZERO independent of the values stored. Excitation of one or many rows may be provided by filling the row counter with ONEs at every output to be excited, and ZEROs elsewhere, and then toggling the blanking signal with the desired modulation from modulation clock 34. In the illustrated example, the output voltage may take on two values, corresponding to the ONE or ZERO held in each bit of the row counter; in other embodiments, the output voltage may take on a greater range of values, in order to reduce the harmonic content of the output waveforms or to decrease radiated emissions, for example.

Row-driver logic 26 applies an excitation pulse or pulse sequence to each row electrode 20 in succession. During a period in which touch-sensing surface 18 is untouched, none of the column amplifiers registers an above-threshold output. However, when the user places a fingertip on or near the touch-sensing surface, the fingertip capacitively couples one or more row electrodes 20 intersecting touch point 14 to one or more column electrodes 22 also intersecting the touch point. The capacitive coupling induces an above-threshold signal from the column amplifiers associated with the column electrodes beneath (i.e., adjacent to) the touch point. Column-sense logic 28 returns, as the X coordinate of the touch point, the numeric value of the column providing the greatest signal. The touch-screen logic also determines which row was being excited when the greatest signal was received, and returns the numeric value of that row as the Y coordinate of the touch point.

In some scenarios, a passive stylus having a tip of relatively high dielectric-constant material may be used in lieu of the user's fingertip, to capacitively couple row and column electrodes beneath touch point 14. In other scenarios, an active stylus may be used. Instead of capacitively coupling row and column electrodes via a dielectric, an active stylus may sense the arrival of an excitation pulse at the row electrode beneath the touch point, and in response, synchronously inject charge into the column electrode beneath the touch point. These actions emulate the effect of capacitive coupling between row and column electrodes at the touch point. It will be noted that active styluses based on somewhat different operating principles may also be used.

In some examples, a liquid-crystal display (LCD) may be arranged beneath the row and column electrodes of touch screen 12B. In other examples, a light-emitting diode (LED) display, an organic LED (OLED) display, a scanned-beam display, or virtually any other kind of electronic display may be arranged beneath the electrodes. Naturally, in display-enabled variants, the electrodes and other sensory components of the touch screen should be substantially transparent to the image rendered on the display.

Returning now to FIG. 1, electronic device 10 may be configured to support text entry by a user. To that end, the electronic device may present a virtual keyboard 35 on touch screen 12B. The virtual keyboard may comprise an array of keyface facsimiles displayed by an underlying display of the touch screen. Some or all of the keyface facsimiles may include an alphanumeric or symbolic label. When the user touches one or more of the keyface facsimiles with a finger or stylus, an associated keycode may be provided to the operating system of the electronic device. In this way, the electronic device may emulate the function of a mechanical keyboard. Naturally, however, there are significant technologic challenges to simulating the 'feel' of a mechanical keyboard when the keyboard is merely a display object. To address this issue and to provide other benefits, electronic device 10 of FIG. 1 is adaptable to receive a mechanical keyboard 36 as a physical overlay on top of touch screen 12B.

Figure 3:
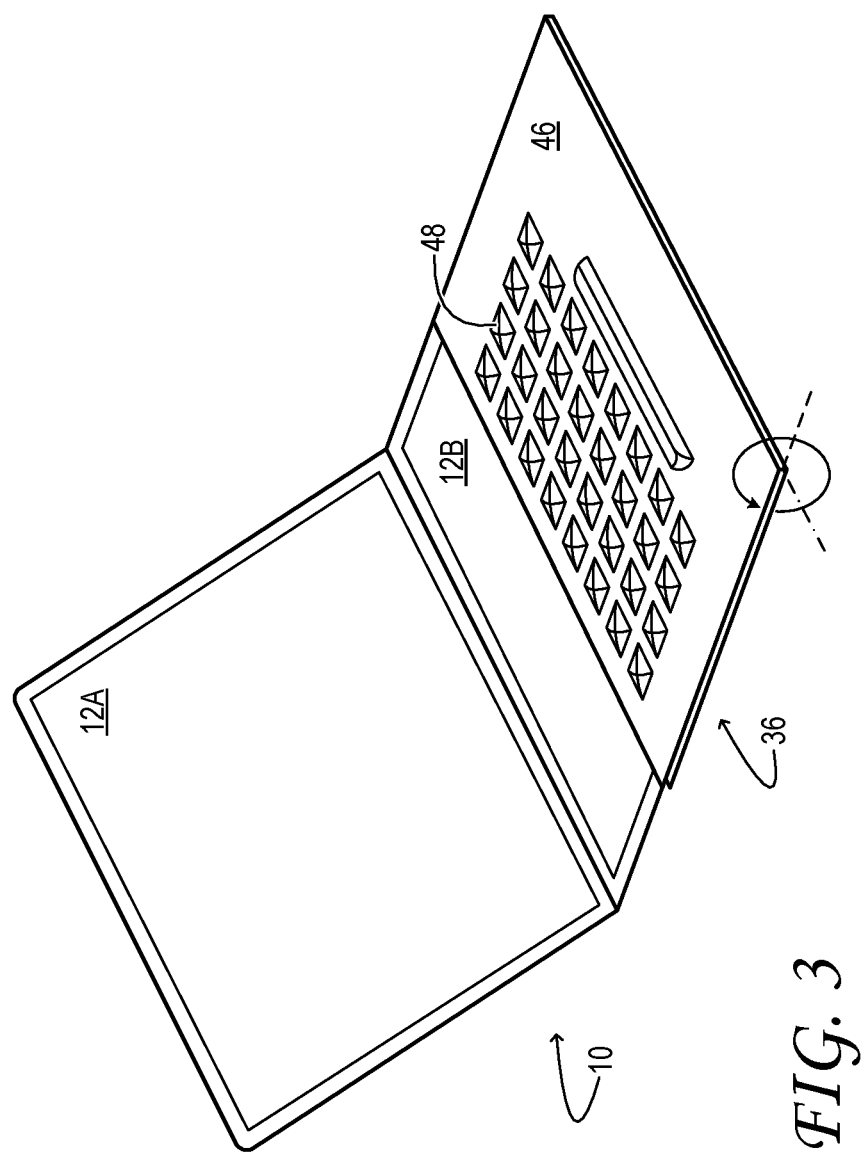
FIG. 3 shows additional aspects of the example electronic device of FIG. 1.

As shown in FIG. 1, mechanical keyboard 36 includes a magnetic base 38 configured to secure the mechanical keyboard to electronic device 10. The magnetic base is coupled rotatably to hinge 40—e.g., a double hinge. The hinge allows almost 360° of rotation, which enables the mechanical keyboard to be folded onto touch screen 12B for use—as shown in FIG. 3—or behind touch screen 12B for stowage. In other examples, different keyboard mounting and stowage configurations may be employed, including some in which the mechanical keyboard is permanent attached to the electronic device.

Electronic device 10 includes an overlay sensor 42 configured to sense when mechanical keyboard 36 is received on the touch-sensing surface of touch screen 12B. The overlay sensor is communicatively coupled to an operating system of the electronic device and configured to switch touch screen 12B into a KEYBOARD mode when the mechanical keyboard is placed on the touch-sensing surface of the touch screen. The KEYBOARD mode may be one of several operating modes of the touch screen—other modes including SINGLE touch, MULTI touch, and PEN mode.

In MULTI touch mode, the various rows of touch screen 12B may drive an a.c. signal, and the various columns may sense the signal at each touch point 14, as described above. SINGLE touch mode may directly probe the self capacitance at the touch point. Here, the rows and columns both drive and sense signal, measuring, in effect, the capacitance between the touched row or column and ground. In PEN mode, both rows and columns are configured to sense the a.c. signal; an active stylus drives the signal, which is detected by the touch screen when it approaches closely enough to couple electrostatically.

The dedicated KEYBOARD mode used in conjunction with mechanical keyboard 36 may be similar to the above PEN mode. With both rows and columns configured only to sense signal, the mechanical keyboard may drive and inject the signal at each keystroke, as further described herein. In some examples, the a.c. drive signal applied by the mechanical keyboard and sensed by touch screen 12B in KEYBOARD mode may differ in some respects—in frequency, phase, waveform, for example—from the signal sensed during PEN mode. Suitable, readily distinguishable drive signals may include 200 kHz, 225 kHz, and 250 kHz, for example.

In some implementations, any, some, or all of the above modes may be associated with a different, recurring time window of any suitable duration. In MULTI touch mode, for example, touch screen 12B may operate at a frame rate of 100 Hz (10 milliseconds (ms) per frame), with 6 ms dedicated to multi-touch sensing, 1 ms to single touch sensing, and 1 ms to pen tracking. In PEN mode, 6 ms may be provisioned for pen tracking and 2 ms for touch sensing, and so on. In KEYBOARD mode, accordingly, 6 ms may be provisioned for tracking signal from the mechanical keyboard, and an additional 2 ms for touchpoint and pen searching. Naturally, frame rates and time windows of other durations are also envisaged.

The KEYBOARD mode may enable multitouch sensing limited to specified areas of the touch screen, such as areas directly below the mechanical keyboard, so as to ignore the effect of the user's palm resting on the touch-sensitive surface, for example. In some examples, multitouch sensing may be limited in KEYBOARD mode to specified key combinations, such as an alphanumeric key together with SHIFT, CNTRL, ALT, or combinations thereof. In some examples, sensory componentry of the touch screen may be trained to recognize appropriate key combinations. Other features of the KEYBOARD mode are described hereinafter.

The configuration of overlay sensor 42 is not particularly limited. In some examples, the overlay sensor may include a dedicated optical, mechanical, or Hall-effect sensor. In other implementations, the overlay sensor may be embodied in the row-excitation and column-sense componentry of touch screen 12B itself. For instance, the touch screen may be configured to sense a pattern of conductive or high dielectric-constant material arranged on the underside 44 of mechanical keyboard 36 when the mechanical keyboard is received on the touch screen. The conductive or high dielectric-constant material may effect localized capacitive coupling between row and column electrodes of the touch screen, akin a finger or passive stylus.

Figure 4:
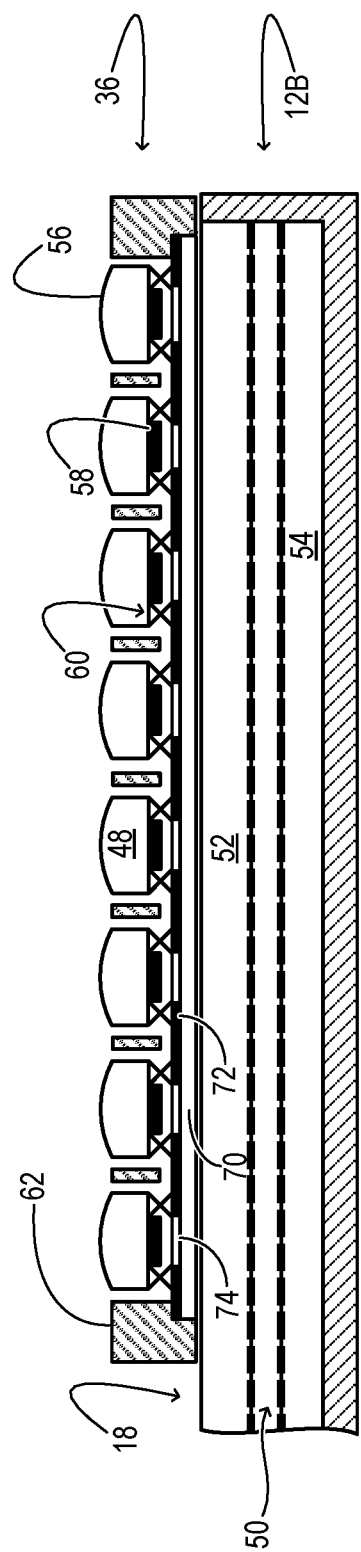
FIG. 4 shows, in cross section, additional aspects of an example touch screen and mechanical-keyboard overlay.

As shown in FIG. 3, an array of individually and resiliently depressible keys 48 are arranged on the top side 46 of mechanical keyboard 36. The keys are also shown in FIG. 4, which provides a cross-sectional view of touch screen 12B and of mechanical keyboard 36 in one example. In particular, FIG. 4 shows a sensory layer 50 of touch screen 12—with row and column electrodes—arranged beneath a cover glass 52. LCD 54 is arranged beneath the sensory layer. Each key 48 of mechanical keyboard 36 includes a user-facing keyface, or outer portion 56. Each key also includes screen-facing, electrically conductive inner portion 58. The inner portion is configured to approach the touch screen during depression of the key. Individual spring members 60 are configured to provide a restorative force to push each key back up and away from the touch screen when depression of that key has ceased. In some examples, each spring member comprises a plastic scissor structure coupled pivotally to opposite lateral sides of the key. A resilient (e.g., silicone) dome may be positioned within the scissor structure, to provide the desired restorative force and tactile sensation.

In some examples, each key 48 is substantially transparent or substantially translucent. Accordingly, graphical image content from LCD 54 presented on the area of touch screen 12B directly below mechanical keyboard 36 may be transmitted up through the mechanical keyboard, to the user. Such image content may take the form of virtual keyboard 35, for example. This optional feature enables various visual aspects of keyface 56—brightness, color, and/or alphanumeric label, for example—to be changed depending on the operating state of electronic device 10. In examples in which the keys are transparent or translucent, the various electrically conductive portions of the keys may comprise very thin wires, or films formed from a degenerately doped semiconductor, such as indium tin oxide (ITO). In examples in which the keys are not transparent or translucent, a printed alphanumeric or symbolic label may be provided on any, some, or all of the keys. In implementations in which a mechanical keyboard with printed keyfaces is used in conjunction with a plural touch screen device (as shown in FIGS. 1 and 3), a backlight or any other display component of the overlaid touch screen may be deactivated, in order to conserve power. However, the touch-sensing components of the overlaid touch screen may remain powered.

In the example illustrated in FIG. 4, the array of keys 48 is arranged in a conductive armature 62, which may be coupled to an electrical ground shared by touch screen 12B. The connection to the electrical ground of the touch screen may be a direct, ohmic coupling shared via electrical interface 64 of electronic device 10, with reference now to FIG. 1. The term 'ohmic coupling' is used herein to indicate a d.c. coupled electrical connection, as provided via electrical conductors arranged in direct contact, such that Ohm's Law is maintained at the interface.

More generally, electronic device 10 may include virtually any form of electrical interface 64 for coupling to mechanical keyboard 36. As in the above ground-sharing example, the electrical interface may present one or more ohmic couplings to the mechanical keyboard. Such ohmic coupling may be received via an appropriate ohmic contact 66 (e.g., a pad, plug or jack) presented by the mechanical keyboard. In other examples, the electrical interface may provide one or more electrostatic couplings to mechanical keyboard 36. The term 'electrostatic coupling' is used herein to indicate an a.c. or capacitively coupled electrical connection, as provided via electrical conductors separated by a gap or dielectric. Such electrostatic coupling may be received via an appropriate electrostatic contact presented by the mechanical keyboard. In some examples, the electrical interface of the touch screen may provide both ohmic and electrostatic coupling to the mechanical keyboard.

Continuing in FIG. 1, mechanical keyboard 36 includes a network of electrical conductors 68 configured to conduct a drive signal to inner portion 58 of each key 48. The network of electrical conductors may include narrow-gauge wires and/or flexible conductive paths running from the inner portion of one key to the inner portion of an adjacent key. In some examples, the network of electrical conductors may comprise the various spring members 60 associated with the keys. Here, the spring members themselves may be conductive and may form part of the network.

In this and other examples, the drive signal is received, during the depression of key 48, at a locus of touch screen 12B directly beneath the key. Because the signal-receiving column electrodes of the touch screen are arranged beneath a dielectric layer (e.g., cover glass 52), the drive signal from mechanical keyboard 36 is received electrostatically by the touch screen, similar to the manner in which drive signal from an active stylus (vide supra) is received at touch point 14. Again it will be noted that the conductive inner portion 58 of the key does not necessarily have to touch the touch-sensing surface 18 of the touch screen in order for the drive signal to be received at the appropriate column electrode, or electrodes. In some examples, a close approach to the cover glass—to within 20 millimeters, for instance—is sufficient for receipt of the drive signal. Accordingly, in the example shown in FIG. 4, a thin protective layer 70, such as a polymer film or fabric, may cover the underside of the mechanical keyboard. This feature may protect the touch screen from abrasion by the mechanical keyboard.

In the examples illustrated in FIGS. 1 and 4, mechanical keyboard 36 includes an electrically conductive screen 72 arranged below the array of keys 48, between inner portion 58 of each key and touch screen 12B. The conductive screen may be connected to an electrical ground of touch screen 12B. The conductive screen includes a thru-hole 74 aligned in registry with the inner portion of each key. The thru-hole enables the drive signal to be transmitted to the locus of the touch screen directly beneath that key, while blocking transmission to surrounding areas. This optional feature reduces the amplitude of the drive signal received at key positions adjacent to the true position, which increases the signal-to-noise ratio of keypress detection.

In the example of FIG. 1, mechanical keyboard 36 includes first and second signal drivers 76. Each signal driver is coupled to network 68 and configured to provide a drive signal thereto. The drive signal may include an alternating (a.c.) voltage of a frequency compatible with the touch-sensing componentry of touch screen 12B. In some examples, the drive signal may be a facsimile of the waveform provided by row-excitation componentry 26 of the touch screen. In the illustrated example, the network conducts each drive signal to alternating rows of keys 48—viz., to inner portion 58 of each key. In other examples, the network may conduct each drive signal to alternating columns, or to any other suitable pattern of keys. In still other examples, only one signal driver may be provided, and the network may be configured to conduct the drive signal concurrently to the conductive inner portions of all of the keys at all times. In examples in which two or more signal drivers supply two or more drive signals via network 68, the two or more drive signals may differ with respect to frequency and/or phase. Accordingly, different keys may receive drive signals differing in frequency and/or phase and may provide such signals to the touch screen upon depression of the keys. This optional aspect may provide improved discrimination among closely spaced keys.

In the example of FIG. 1, mechanical keyboard 36 includes a power source 78 from which electrical power is provided to signal drivers 76. It will be noted that the mechanical keyboard may require very low power for operation. The nature of the power source is not particularly limited. Suitable power sources include rechargeable or disposable batteries, photovoltaic cells, or an electromagnetic (EM) receiver operatively coupled to a suitable d.c. rectifier. In some examples, the power source may simply be a point of direct ohmic contact—e.g., a jack or plug—through which power is drawn from electrical interface 64 of electronic device 10. In this manner, for example, the electrical interface of the electronic device may be configured to supply power to the mechanical keyboard.

FIGS. 5 through 7 show aspects of additional example mechanical keyboards. The mechanical keyboards shown in these drawings are similar in some respects to mechanical keyboard 36 of FIG. 1, but they include neither a signal driver nor a power source. In FIG. 5, network 68' of mechanical keyboard 36' includes a conductor coupled ohmically to signal-driver output 80 of electronic device 10'. Here, electrical interface 64' of the electronic device is configured to supply drive signal to the mechanical keyboard.

In FIG. 6, network 68" of mechanical keyboard 36" includes a conductor coupled electrostatically to a portion of the touch screen beneath the mechanical keyboard. Here, the network includes plural, parallel conductive bands 82 arranged horizontally across the mechanical keyboard, opposing the touch-sensing surface of the touch screen. In some examples, one band may be sufficient. The network of electrical conductors is configured to receive electrostatically, via the conductive band(s), one or more drive signals from the energized row electrodes of the touch screen and to conduct the one or more drive signals to the inner portion 58 of each key, the drive signal being received back into the touch screen, during the depression of a key, at a locus of touch screen directly beneath the key.

In FIG. 7, network 68''' of mechanical keyboard 36''' includes a conductive band 84 coupled electrostatically to the touch screen, but here, the portion of the touch screen that supplies the signal lies outside the boundaries of the mechanical keyboard. Whether provided through ohmic or electrostatic coupling to the touch screen, the drive signal may be one of a plurality of drive signals supplied to the mechanical keyboard, each of the plurality of drive signals being routed to a corresponding plurality of rows or other sets of keys of the mechanical keyboard.

In examples in which energized row electrodes of touch screen 12B are used to supply drive signal electrostatically to the network of conductors of a mechanical keyboard, the KEYBOARD mode of the touch screen may specify an appropriate row excitation scheme. The row-excitation scheme in KEYBOARD mode may differ from the row-excitation scheme used in the various touch-sensing modes. For instance, excitation may be limited to rows directly beneath the elongate conductors of the network configured to receive the drive signal.

No aspect of the foregoing drawings or description should be understood in a limiting sense, for numerous variations, extensions, and omissions are also envisaged. For instance, although the drawings show configurations applicable to receiving two different drive signals in a network of conductors, and distributing the drive signals to alternating rows of keys, different numbers of drive signals and distribution to different groupings of keys are also envisaged. Furthermore, although some touch screens may employ elongate row and column electrodes that span many pixels, as described above, other touch screens may employ 'in-cell' technology, where every touch-screen pixel includes its own, individually addressable excitation and sensory electrode. The electronic-device and mechanical-keyboard implementations disclosed herein are equally compatible with this technology as well.

One aspect of this disclosure is directed to a mechanical keyboard for use on a touch screen, the mechanical keyboard comprising: an individually and resiliently depressible key including a user-facing outer portion and a screen-facing, electrically conductive inner portion, the inner portion being configured to approach the touch screen during depression of the key; and a network of electrical conductors configured to conduct a drive signal to the inner portion of the key, the drive signal being received, during the depression of the key, at a locus of touch screen directly beneath the key.

In some implementations, the mechanical keyboard further comprises a signal driver coupled to the network and configured to provide the drive signal thereto. In some implementations, the mechanical keyboard further comprises a power source configured to supply electrical power to the signal driver. In some implementations, the key is one of a plurality of individually and resiliently depressible keys arranged in a conductive armature, and the armature is configured to couple to an electrical ground of the touch screen. In some implementations, the drive signal is one of a plurality of drive signals supplied by the network to the plurality of keys, and different keys receive drive signals differing in frequency and/or phase. In some implementations, the mechanical keyboard further comprises an electrically conductive screen arranged below the inner portion of the key, between the key and the touch screen, the conductive screen is coupled to an electrical ground of the touch screen, and the conductive screen includes a thru-hole aligned in registry with the inner portion of the key, to transmit the drive signal to the locus of the touch screen directly beneath the key. In some implementations, the network includes a conductor coupled ohmically to a signal-driver output of the touch screen. In some implementations, the network includes a conductor coupled electrostatically to a portion of the touch screen beneath the mechanical keyboard. In some implementations, the network includes a conductor coupled electrostatically to a portion of the touch screen outside the mechanical keyboard. In some implementations, the mechanical keyboard further comprises a hinge configured to enable the mechanical keyboard to fold onto or behind the touch screen. In some implementations, the key is substantially transparent or substantially translucent.

Another aspect of this disclosure is directed to an electronic device adaptable to receive a mechanical keyboard, the electronic device comprising: a touch screen; and an electrical interface for connection to the mechanical keyboard, the mechanical keyboard comprising an individually and resiliently depressible key including a user-facing outer portion and a screen-facing, electrically conductive inner portion, the inner portion being configured to approach the touch screen during depression of the key; and a network of electrical conductors configured to conduct a drive signal to the inner portion of the key, the drive signal being received, during the depression of the key, at a locus of touch screen directly beneath the key.

In some implementations, the electrical interface is configured to supply power to the mechanical keyboard. In some implementations, the electrical interface is configured to share an electrical ground with the mechanical keyboard. In some implementations, the electrical interface is configured to supply the drive signal to the mechanical keyboard. In some implementations, the drive signal is supplied electrostatically. In some implementations, the drive signal is one of a plurality of drive signals supplied to the mechanical keyboard. In some implementations, the electronic device further comprises an overlay sensor configured to sense when the mechanical keyboard is received on the touch screen.

Another aspect of this disclosure is directed to a mechanical keyboard for use on a touch screen, the mechanical keyboard comprising: an individually and resiliently depressible key including a user-facing outer portion and a screen-facing, electrically conductive inner portion, the inner portion being configured to approach the touch screen during depression of the key; and a network of electrical conductors configured to receive a drive signal electrostatically from the touch screen and to conduct the drive signal to the inner portion of the key, the drive signal being received back into the touch screen, during the depression of the key, at a locus of the touch screen directly beneath the key.

In some implementations, the network includes one or more parallel conductive bands arranged horizontally across the mechanical keyboard, opposing the touch screen.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mechanical keyboard for use on a touch screen, the mechanical keyboard comprising:
   an individually and resiliently depressible key including a user-facing outer portion and a screen-facing, electrically conductive inner portion, the inner portion being configured to approach the touch screen during depression of the key; and
   a network of electrical conductors configured to conduct a drive signal to the inner portion of the key, the drive signal being received, during the depression of the key, at a locus of touch screen directly beneath the key.

2. The mechanical keyboard of claim 1 further comprising a signal driver coupled to the network and configured to provide the drive signal thereto.

3. The mechanical keyboard of claim 2 further comprising a power source configured to supply electrical power to the signal driver.

4. The mechanical keyboard of claim 1 wherein the key is one of a plurality of individually and resiliently depressible keys arranged in a conductive armature, and wherein the armature is configured to couple to an electrical ground of the touch screen.

5. The mechanical keyboard of claim 4 wherein the drive signal is one of a plurality of drive signals supplied by the network to the plurality of keys, and wherein different keys receive drive signals differing in frequency and/or phase.

6. The mechanical keyboard of claim 1 further comprising an electrically conductive screen arranged below the inner portion of the key, between the key and the touch screen, wherein the conductive screen is coupled to an electrical ground of the touch screen, and wherein the conductive screen includes a thru-hole aligned in registry with the inner portion of the key, to transmit the drive signal to the locus of the touch screen directly beneath the key.

7. The mechanical keyboard of claim 1 wherein the network includes a conductor coupled ohmically to a signal-driver output of the touch screen.

8. The mechanical keyboard of claim 1 wherein the network includes a conductor coupled electrostatically to a portion of the touch screen beneath the mechanical keyboard.

9. The mechanical keyboard of claim 1 wherein the network includes a conductor coupled electrostatically to a portion of the touch screen outside the mechanical keyboard.

10. The mechanical keyboard of claim 1 further comprising a hinge configured to enable the mechanical keyboard to fold onto or behind the touch screen.

11. The mechanical keyboard of claim 1 wherein the key is substantially transparent or substantially translucent.

12. An electronic device adaptable to receive a mechanical keyboard, the electronic device comprising:
   a touch screen; and
   an electrical interface for connection to the mechanical keyboard, the mechanical keyboard comprising an individually and resiliently depressible key including a user-facing outer portion and a screen-facing, electrically conductive inner portion, the inner portion being configured to approach the touch screen during depression of the key; and a network of electrical conductors configured to conduct a drive signal to the inner portion of the key, the drive signal being received, during the depression of the key, at a locus of touch screen directly beneath the key.

13. The electronic device of claim 12 wherein the electrical interface is configured to supply power to the mechanical keyboard.

14. The electronic device of claim 12 wherein the electrical interface is configured to share an electrical ground with the mechanical keyboard.

15. The electronic device of claim 12 wherein the electrical interface is configured to supply the drive signal to the mechanical keyboard.

16. The electronic device of claim 15 wherein the drive signal is supplied electrostatically.

17. The electronic device of claim 15 wherein the drive signal is one of a plurality of drive signals supplied to the mechanical keyboard.

18. The electronic device of claim 12 further comprising an overlay sensor configured to sense when the mechanical keyboard is received on the touch screen.

19. A mechanical keyboard for use on a touch screen, the mechanical keyboard comprising:
   an individually and resiliently depressible key including a user-facing outer portion and a screen-facing, electrically conductive inner portion, the inner portion being configured to approach the touch screen during depression of the key; and
   a network of electrical conductors configured to receive a drive signal electrostatically from the touch screen and to conduct the drive signal to the inner portion of the key, the drive signal being received back into the touch screen, during the depression of the key, at a locus of the touch screen directly beneath the key.

20. The mechanical keyboard of claim 19 wherein the network includes one or more parallel conductive bands arranged horizontally across the mechanical keyboard, opposing the touch screen.

* * * * *